United States Patent
Steiner

(10) Patent No.: US 9,532,678 B2
(45) Date of Patent: Jan. 3, 2017

(54) CLEANING SYSTEM FOR A COFFEE MACHINE OR A SIMILAR DEVICE

(75) Inventor: Adrian Steiner, Weggis (CH)

(73) Assignee: STEINER AG WEGGIS, Weggis (CH)

( * ) Notice: Subject to any disclaimer, the term of this patent is extended or adjusted under 35 U.S.C. 154(b) by 206 days.

(21) Appl. No.: 14/127,207

(22) PCT Filed: Jun. 28, 2012

(86) PCT No.: PCT/EP2012/002716
§ 371 (c)(1),
(2), (4) Date: Jan. 17, 2014

(87) PCT Pub. No.: WO2013/000573
PCT Pub. Date: Jan. 3, 2013

(65) Prior Publication Data
US 2014/0116475 A1    May 1, 2014

(30) Foreign Application Priority Data

Jun. 30, 2011   (CH) ...................................... 1110/11

(51) Int. Cl.
*A47J 31/44*    (2006.01)
*A47J 31/46*    (2006.01)
*A47J 31/60*    (2006.01)
*C11D 17/00*    (2006.01)

(52) U.S. Cl.
CPC ................. *A47J 31/60* (2013.01); *A47J 31/44* (2013.01); *A47J 31/46* (2013.01); *A47J 31/462* (2013.01); *C11D 17/0073* (2013.01)

(58) Field of Classification Search
CPC .......... A47J 31/44; A47J 31/46; A47J 31/462; A47J 31/60; C11D 17/0073
USPC ..................................... 134/93, 104.1, 166 C
See application file for complete search history.

(56) References Cited

U.S. PATENT DOCUMENTS

| | | | |
|---|---|---|---|
| 7,178,453 | B2 | 2/2007 | In Albon |
| 7,527,818 | B2 | 5/2009 | Dirren |
| 8,357,416 | B2 | 1/2013 | Schindler et al. |
| 2002/0083543 | A1 | 7/2002 | Geiger et al. |
| 2009/0029897 | A1 | 1/2009 | Behr et al. |
| 2010/0058932 | A1 | 3/2010 | Beutlrock et al. |
| 2011/0256289 | A1 | 10/2011 | Steiner |

FOREIGN PATENT DOCUMENTS

| | | |
|---|---|---|
| DE | 102005025964 A1 | 12/2006 |
| DE | 102006060745 A1 | 6/2008 |
| EP | 1210894 A1 | 11/2001 |
| WO | 2013000573 A3 | 1/2013 |

*Primary Examiner* — Michael Barr
*Assistant Examiner* — Levon J Shahinian
(74) *Attorney, Agent, or Firm* — Brian Roffe

(57) ABSTRACT

Cleaning system for coffee machines and similar devices, in the cleaning circuit of which a cleaning key having a storage chamber is installed for receiving appropriately configured cleaning tablets. The cleaning key can be turned in a sleeve-like housing into two operating positions at defined angles of rotation, wherein in one operating position the storage chamber is fixed in the housing while in the other operating position, the storage chamber is released and can be removed from the housing to be filled or refilled with suitably packaged cleaning tablets.

15 Claims, 5 Drawing Sheets

CLEANING SYSTEM FOR A COFFEE MACHINE OR A SIMILAR DEVICE

FIELD OF THE INVENTION

The invention relates to a cleaning system for a coffee machine or a similar device, comprising a cleaning circuit in which a preferably soluble cleaning agent is delivered to the cleaning liquid.

BACKGROUND OF THE INVENTION

Devices of this type must guarantee a high degree of cleanliness of the products produced. For this purpose thorough cleaning of the respective units is carried out periodically in such a way that the latter are flushed with a cleaning liquid enriched with cleaning agents from time to time. Here the cleaning agent is delivered by means of a metering screw with a complex structure and control system which interacts with an equally complex metering cabinet.

OBJECTS AND SUMMARY OF THE INVENTION

The object underlying the invention is to bring about the delivery of the cleaning agent with the simplest possible apparatus which works reliably and is easy to handle.

This object is achieved according to the invention in that there is installed in the cleaning circuit a cleaning key that can be switched into two operating positions and comprises a storage chamber for the cleaning agent, the storage chamber being blocked in the one operating position, while in the other operating position it is unblocked and can be moved into a freely accessible position as required. In this position it can easily be filled with the respectively provided cleaning agent. With the aid of the cleaning key it can also be guaranteed, for example, that the operation is only carried out by authorised staff members.

Within the context of a structurally simple and reliable construction provision is made according to the invention such that the cleaning key can be inserted into a sleeve-shaped housing and in the latter can be turned from one operating position to the other, the storage chamber in the one operating position being fixed in the housing, while in the other operating position it is released and can be removed with the cleaning key from the housing. In order to clear the storage chamber it is only necessary to bring the cleaning key into the latterly mentioned operating position and then to withdraw it from the housing. The storage chamber is then therefore freely accessible and can easily be filled or refilled with the suitable cleaning agent. In order to fix the storage chamber in the other operating position it is advantageous to provide the cleaning key with holding means which in this operating position can be engaged in a circumferential groove of the housing.

Furthermore, the invention makes provision such that the storage chamber is hollow cylindrical in form and is provided with a side window for introduction of the cleaning agent. In this way the latter can be introduced easily, preferably in tablet form, into the storage chamber.

Provision is also made according to the invention such that the housing of the cleaning key is provided with inlet and outlet connections, arranged on the side, for delivering and discharging the cleaning liquid to and from the storage chamber of the cleaning key, the latter having appropriately arranged flushing openings which, with the storage chamber blocked, are flush with the corresponding inlet and outlet connections of the housing.

In this way it is guaranteed that the storage chamber can only be flushed by the cleaning liquid in this operating position. During the flushing of the chamber the cleaning tablets located here are dissolved in the cleaning liquid and thus give it the respectively desired properties.

The invention further relates to a cleaning tablet for the cleaning key proposed above, which is characterised in that its configuration is matched to the geometry of the storage chamber of the cleaning key. In this way it is guaranteed that only suitably packaged tablets can be used, the properties of which as regards the desired cleaning effect are optimal.

Within the context of simple production and handling of the tablets it is advantageous if the latter are shaped like discs and their outer diameter has dimensions such that they can preferably be inserted upright and to a large extent without any play in the hollow cylindrical storage chamber of the cleaning key.

With regard to the correct positioning of the tablets it is advantageous to form them annularly and to provide them with a central bore hole into which a centring pin of the housing can be inserted to a large extent without any play. This measure also contributes to the fact that only suitably packaged tablets can be inserted in the cleaning key.

It is advantageous for optimisation of the cleaning effect for the tablet thickness to have dimensions according to the invention such that a number of tablets, optionally made differently, can be stacked in the storage chamber of the cleaning key. Depending on the amount and properties of the individual tablets used, the cleaning effect can be adjusted within broad limits.

BRIEF DESCRIPTION OF THE DRAWINGS

In the following the invention is described in more detail by means of an exemplary embodiment with reference to the drawings. These show as follows.

DETAILED DESCRIPTION OF THE INVENTION

Figure 1:
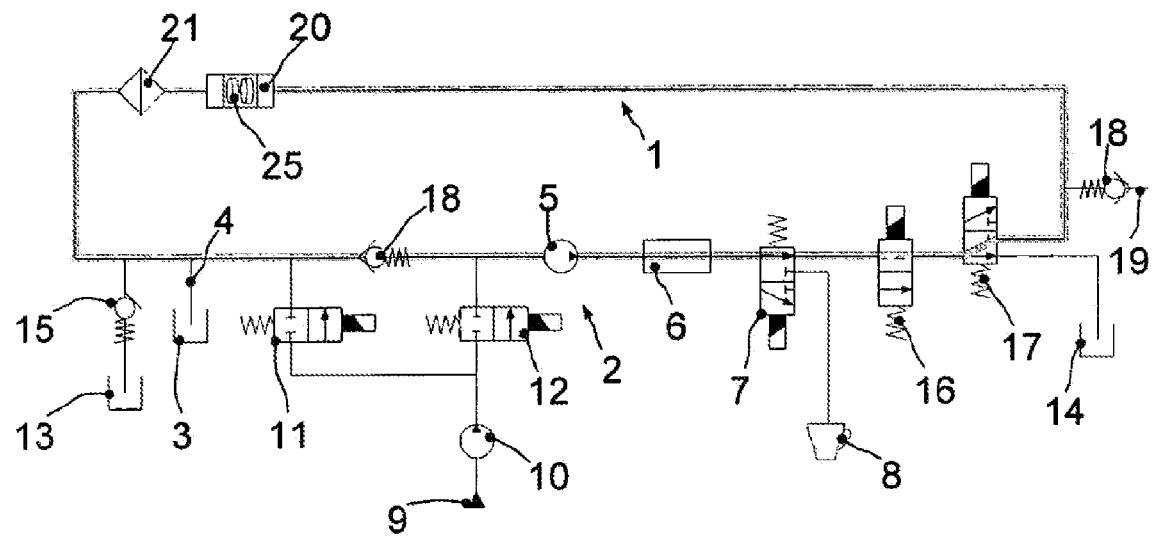
FIG. 1 is a cleaning circuit with a cleaning key according to the invention for the milk unit of a coffee machine, shown diagrammatically.
Figure 2:
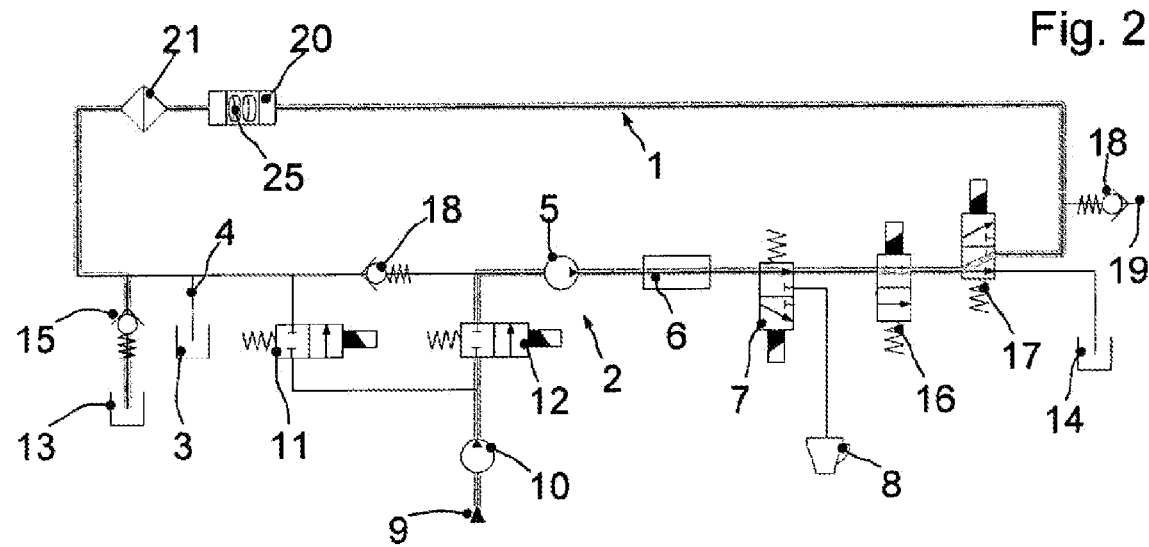
FIG. 2 is the cleaning circuit according to FIG. 1, shown in the filling phase of the cleaning process.
Figure 3:
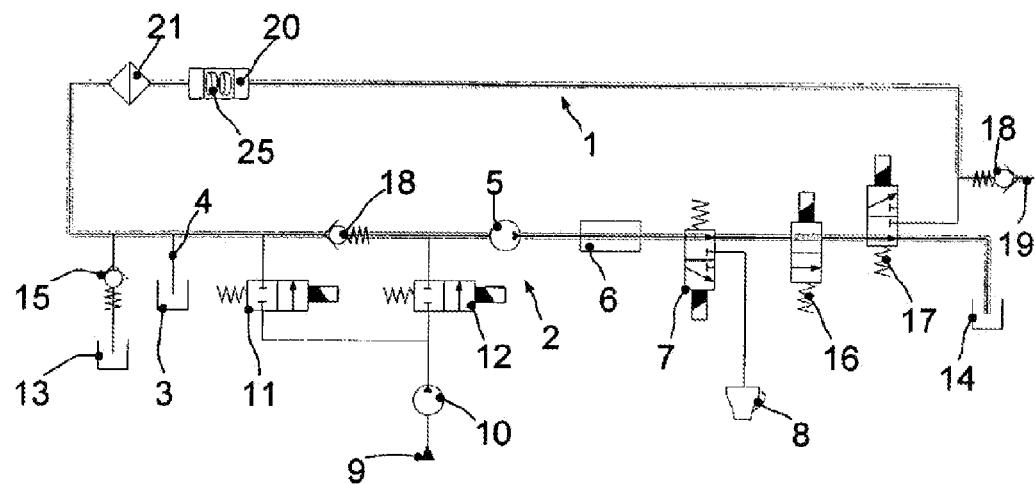
FIG. 3 is the cleaning circuit according to FIG. 1, in the emptying phase of the cleaning process.
Figure 4:
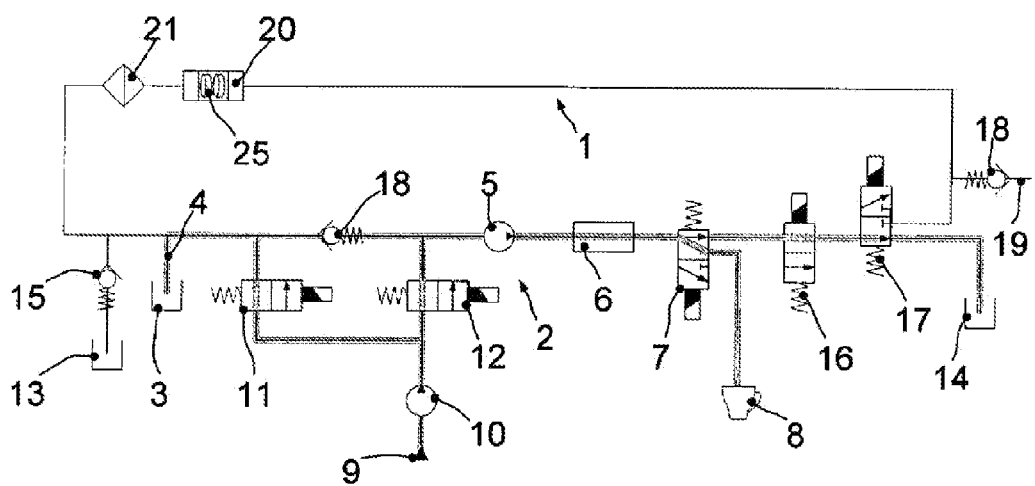
FIG. 4 is the cleaning circuit according to FIG. 1 in the flushing phase of the product process.
Figure 5:
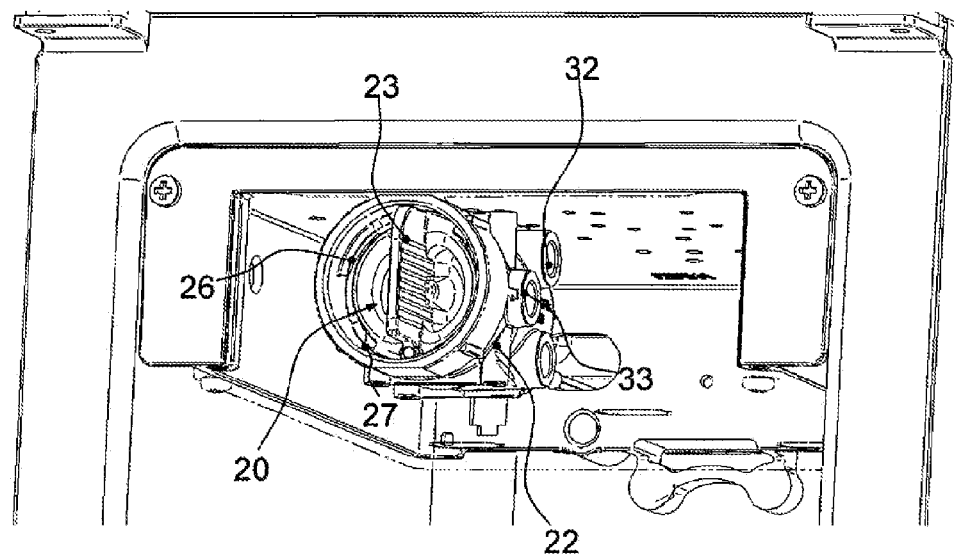
FIG. 5 is the cleaning key according to the invention, shown in the installed state and perspectively.

The cleaning circuit 1 according to FIG. 1 to FIG. 4 is used to periodically clean a milk unit 2 for producing heated milk, milk froth or drinks containing milk. The unit 2 is equipped with a milk tank 3, a suction lance 4, a milk pump 5, a milk heating device 6, a milk outlet valve 7 and a milk removal point 8. The cleaning circuit 1 also includes a water network connection 9 and a water pump 10 with directional valves 11 and 12 and two water outflow points 13 and 14, in front of and behind the milk unit 2, upstream of which a check valve 15 and directional valves 16 and 17 are connected. Furthermore, additional check valves 18 are disposed between the directional valves 11 and 12 and in a branch line 19.

Also installed in the cleaning circuit 1 according to the invention is a cleaning key 20 with which a cleaning agent, preferably in tablet form, can be delivered to the cleaning liquid. A strainer or filter 21 is connected upstream of the cleaning key 20.

The mode of operation of the cleaning circuit 1 can be deduced from FIG. 1 to FIG. 4. Since this is prior art, it is also unnecessary to discuss its mode of operation in any more detail.

The cleaning key 20 according to the invention is inserted into a sleeve-like housing 22 which, on its part, is fastened at an easily accessible point of the machine, for example in the milk refrigerator.

Figure 6A:
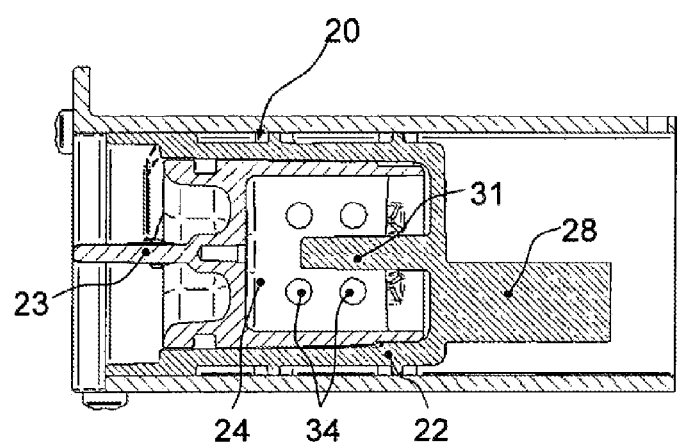
FIG. 6a is a section through the cleaning key from FIG. 5, shown in the blocked operating position.
Figure 6B:
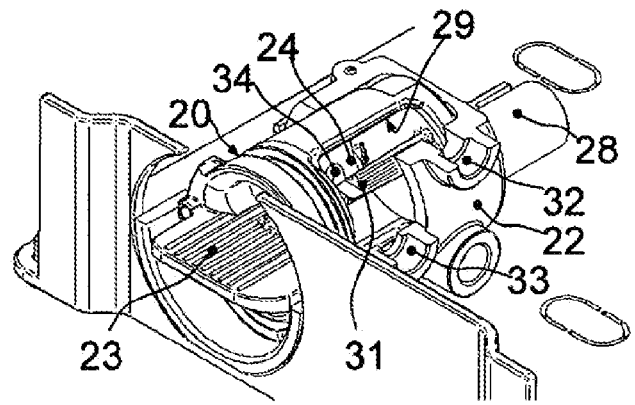
FIG. 6b is the cleaning key according to FIG. 5 in the blocked operating position, shown perspectively.
Figure 7A:
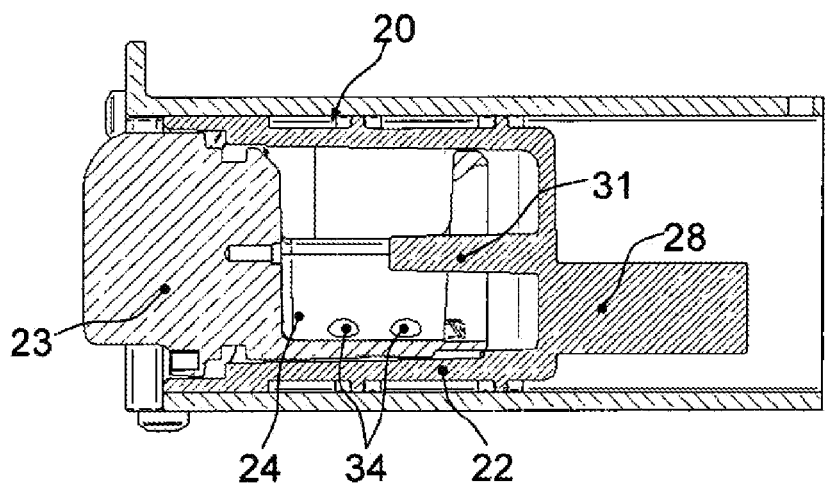
FIG. 7a is a section through the cleaning key from FIG. 5, shown in the unblocked operating position.
Figure 7B:
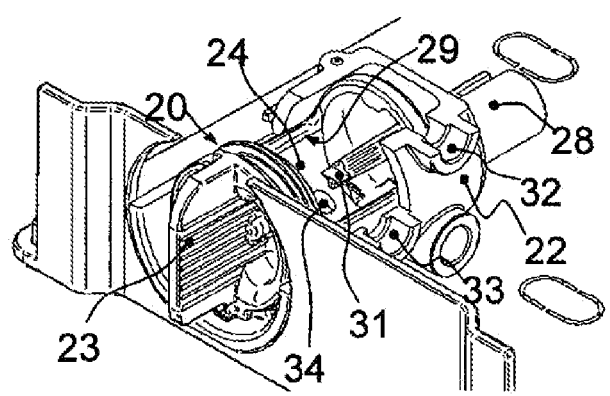
FIG. 7b is the cleaning key from FIG. 5 in the unblocked operating position, shown perspectively.

The cleaning key 20 has a wing head 23 with which it can be turned within the housing 22 between two operating positions at defined angles of rotation. The cleaning key 20 further comprises a storage chamber 24 for receiving cleaning tablets 25 which can dissolve in the cleaning liquid during the cleaning process. The cleaning key 20 is then located in the operating position according to FIG. 6a and FIG. 6b in which the storage chamber 24 is fixed in the housing 22 with a holding means 27 engaging in its circumferential groove 26. In the operating position according to FIG. 7a and FIG. 7b the storage chamber 24 is released, however, and can be removed from the housing 22 by removing the cleaning key 20. A sensor device 28 is applied to the rear side of the housing 22. This is a component part of the control system of the machine.

Figure 8:
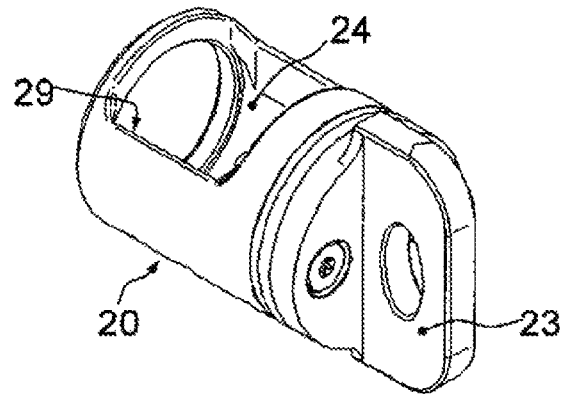
FIG. 8 is the cleaning key from FIG. 6 and FIG. 7 with an empty storage chamber, shown in simplified form and perspectively.
Figure 9:
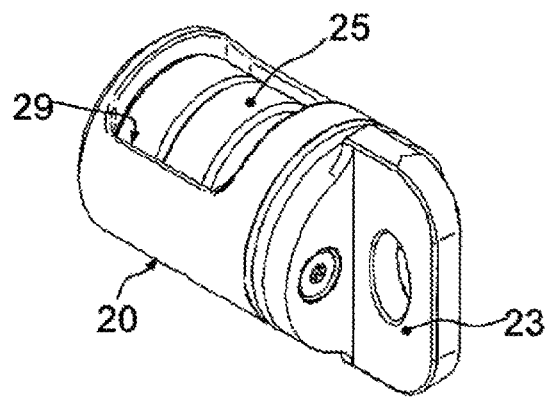
FIG. 9 is the cleaning key from FIG. 8 with a filled storage chamber, likewise in simplified form and perspectively.
Figure 10:
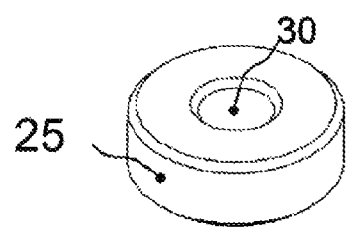
FIG. 10 is an annular cleaning tablet for the cleaning key according to FIGS. 5 to 9.

As can be seen in particular from FIG. 8 and FIG. 9, the storage chamber 24 of the cleaning key 20 is hollow cylindrical in form and has a side window 29 through which the cleaning tablets 25 can be inserted in the storage chamber 24 as required. In order to facilitate this operation the window is slightly widened on the rear side. The cleaning tablets 25 are shaped like discs and their circumference is matched to the geometry of the storage chamber 24. They can therefore be inserted upright and to a large extent without any play in the hollow cylindrical storage chamber 24.

In addition, the cleaning tablets 25 are annular in form and have a central bore hole 30 into which a centring pin 31 of the housing 22 can be inserted, to a large extent without any play. Their tablet thickness is determined such that a number of tablets, optionally made differently, can be stacked in the storage chamber 24.

This type of tablet arrangement is illustrated in FIG. 9. The centring pin 31 serves to secure the tablets, centred, in the storage chamber 24. The cleaning effect of the tablets is dependent upon the number and properties of the tablets used.

Needless to say it is also possible within the framework of the invention to use differently configured cleaning tablets provided their configuration is matched to the geometry of the storage chamber of the cleaning key.

Inlet and outlet connectors 32, 33 to which the feeds and sections of the cleaning circuit 1 can be connected are applied to the housing 22 of the key. The storage chamber 24 on its part is provided with correspondingly arranged flushing openings 34 which, with the storage chamber blocked, are flush with the corresponding inlet and outlet connectors 32, 33 of the housing. In this way the interior of the chamber is then flushed so that the cleaning tablets located here can dissolve in the cleaning liquid.

The cleaning key 20 according to the invention can easily be switched over by turning the key head 23. In the one switching position it guarantees reliable operation while the milk unit is flushed, and in the other switching position it makes it possible for the storage chamber 24 to be cleared so that the latter becomes accessible for the filling or refilling of the latter with the cleaning tablets 25. After this the cleaning key 20 is inserted in the housing 22 again and is switched into the original switching position by the key head 23.

The sensor device 28 signals on the one hand the respectively active operating position and on the other hand the filling level of the storage chamber 24. Both signals are important for controlling the function of the system. By encoding the key appropriately it can also be guaranteed by the device that the key is only actuated by authorised staff members.

The invention is sufficiently demonstrated by the exemplary embodiment described. However, it could also be illustrated by further variations. Thus, for example, the housing of the cleaning key could have inlet and outlet connections for delivering and discharging the cleaning liquid which are arranged at the top and the bottom or on the face side or somewhere else instead of these inlet and outlet connections arranged on the side.

The invention claimed is:

1. A cleaning system for a coffee machine or another beverage dispensing device, comprising a housing into which at least one soluble cleaning tablet can be delivered for a cleaning process of a cleaning liquid, the housing including a centering in for centering the at least one cleaning tablet when present;
   a cleaning key insertable in the housing,
   the cleaning key having a portion defining a hollow cylindrical storage chamber and which portion includes a front wall, a peripheral wall around an axis of the cylindrical storage chamber and a rear wall opposite the front wall, the cleaning key being turnable about the axis, the front wall, the peripheral wall and the rear wall cooperating to define the cylindrical storage chamber, the rear wall having an open area opposite the front wall and the centering pin extending into the cylindrical storage chamber through the open area in the rear wall, the peripheral wall including a side window in a surface to a radial side of the cylindrical storage chamber and flushing openings; and inlet and outlet connections for delivering cleaning liquid to and discharging cleaning liquid from the cylindrical storage chamber, the cleaning key being turnable while engaged with the housing between a first position in which the flushing openings are flush with the inlet and outlet connections and a second position in which the flushing openings are not flush with the inlet and outlet connections, whereby the cleaning agent is introducible into the cylindrical storage chamber through the side window in the portion of the cleaning key defining the cylindrical storage chamber.

2. The cleaning system according to claim 1, wherein the housing is a sleeve-shaped housing and the cleaning key is turnable in the housing from a first operating position to a second operating position different than the first operating position, the cylindrical storage chamber in the first operating position being fixed in the housing and in the second operating position being released and removable with the cleaning key from the housing.

3. The cleaning system according to claim 2, wherein the cleaning key is provided with holding means which engage a circumferential groove of the housing when the cleaning key is in the first operating position.

4. The cleaning system according to claim 1, further comprising a sensor device arranged on a rear side of the housing.

5. The cleaning system according to claim 1, wherein each of the at least one cleaning tablet is configured to fit in the cylindrical storage chamber of the cleaning key.

6. The cleaning system according to claim 5, wherein each of the at least one cleaning tablet is shaped like a disc and an outer diameter of each of the cleaning tablet is determined such that the cleaning tablet is insertable upright and without any play in the cylindrical storage chamber of the cleaning key.

7. The cleaning system according to claim 6, wherein each of the at least one cleaning tablet is annular in form and is provided with a central bore hole into which the centering pin of the housing is insertable.

8. The cleaning system according to claim 5, wherein a thickness of each of the at least one cleaning tablet is determined such that a number of tablets are stackable in the cylindrical storage chamber of the cleaning key.

9. The cleaning system according to claim 1, wherein the cleaning key has a first operating position in which it is present in the housing and a second operating position different than the first operating position in which it is present in the housing, the side window of the cylindrical storage chamber being blocked in the first operating position to block introduction of the cleaning agent into the cylindrical storage chamber and the cylindrical storage chamber being unblocked in the second operating position such that after removal of the cleaning key from the housing, the cleaning agent is introducible into the cylindrical storage chamber through the side window of the cleaning key.

10. The cleaning system according to claim 9, wherein the cylindrical storage chamber is fixed in the housing in the first operating position.

11. The cleaning system according to claim 9, further comprising fixing structure to fix the cleaning key in engagement with the housing when the cleaning key is in the first operating position.

12. The cleaning system according to claim 11, wherein the fixing structure comprises a circumferential groove in the housing and a holding member on the cleaning key.

13. The cleaning system according to claim 1, wherein the cleaning key is turnable in the housing between a first operating position and a second operating position different than the first operating position, the cleaning key includes a manually accessible wing head to enable the cleaning key to be turned between the first and second operating positions.

14. The cleaning system according to claim 1, wherein the portion of the cleaning key defining the cylindrical storage chamber is, in its entirety, radially inward of and surrounded by the housing.

15. The cleaning system according to claim 1, wherein the housing has an elongate sleeve shape and has an opening at a first end and a groove at the first end, the cleaning key being configured to be insertable into the elongate sleeved-shaped housing through the opening of the elongate sleeved-shaped housing and including a holding member that engages with the groove to, when engaged with the groove, retain the portion of the cleaning key defining the cylindrical storage chamber radially inward of and entirely inside of the elongate sleeved-shaped housing.

* * * * *

UNITED STATES PATENT AND TRADEMARK OFFICE
CERTIFICATE OF CORRECTION

PATENT NO. : 9,532,678 B2  Page 1 of 1
APPLICATION NO. : 14/127207
DATED : January 3, 2017
INVENTOR(S) : Adrian Steiner It is certified that error appears in the above-identified patent and that said Letters Patent is hereby corrected as shown below:

In the Claims
Claim 1, Column 4, Line 45, after "centering" first instance, change "in" to --pin--.

Signed and Sealed this
Fourteenth Day of March, 2017

Michelle K. Lee
*Director of the United States Patent and Trademark Office*